(12) United States Patent
Ke et al.

(10) Patent No.: US 10,583,500 B2
(45) Date of Patent: Mar. 10, 2020

(54) MULTI-FUNCTIONAL END EFFECTOR

(71) Applicant: ZHEJIANG UNIVERSITY, Hangzhou, Zhejiang Province (CN)

(72) Inventors: Yinglin Ke, Hangzhou (CN); Shaohua Fei, Hangzhou (CN); Junxia Jiang, Hangzhou (CN); Jiangxiong Li, Hangzhou (CN); Zhenzheng Ke, Hangzhou (CN); Huiyue Dong, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 16/080,290

(22) PCT Filed: Aug. 17, 2016

(86) PCT No.: PCT/CN2016/095606
§ 371 (c)(1),
(2) Date: Aug. 27, 2018

(87) PCT Pub. No.: WO2018/010247
PCT Pub. Date: Jan. 18, 2018

(65) Prior Publication Data
US 2019/0061019 A1    Feb. 28, 2019

(30) Foreign Application Priority Data

Jul. 15, 2016    (CN) .......................... 2016 1 0571566

(51) Int. Cl.
*B23C 1/025*    (2006.01)
*B23C 3/02*    (2006.01)
(Continued)

(52) U.S. Cl.
CPC ................ *B23C 1/025* (2013.01); *B23C 3/02* (2013.01); *B23P 23/02* (2013.01); *B64F 5/00* (2013.01);
(Continued)

(58) Field of Classification Search
CPC .. B23C 1/025; B23C 1/12; B23C 7/02; B23C 2215/04; B23C 2220/24; B23C 2220/52;
(Continued)

(56) References Cited

FOREIGN PATENT DOCUMENTS

| CN | 102658391 | 9/2012 |
|----|-----------|--------|
| CN | 102794491 | 11/2012 |

(Continued)

OTHER PUBLICATIONS

English translation of CN 103894678, Jul. 2014 (Year: 2014).*
English translation of CN 102794491, Nov. 2012 (Year: 2012).*

*Primary Examiner* — Alan Snyder
(74) *Attorney, Agent, or Firm* — Jiwen Chen

(57) ABSTRACT

The present invention discloses a multifunctional end effector, comprising a base (54) and a cutting tool (39); a feed slide (52) on the base (54) and a feed driving mechanism used to drive feed slide (52) to feed cutting tool (39); a swing slide (55) on the feed slide (52) and a swing driving mechanism used to drive swing slide (55) to realize circular arc swing of cutting tool (39); a mounting base (12) on the swing slider (55); a revolving rotation shaft (20) and a rotation shaft driving mechanism used to drive revolving rotation shaft (20) to make the cutting tool rotate in the mounting base (12); an eccentric slide (27) fixed to the end of revolving rotation shaft (20); cutting tool (39) is connected to the end of eccentric slide (27) via the electric spindle (37) and an eccentric regulating mechanism used to regulate eccentric slide (27) and control radial bias of cutting tool (39). Use feed driving mechanism to realize feed of (Continued)

cutting tool or feed of cutting tool along the swing trail through combination with swing driving mechanism; use eccentric regulating mechanism to realize radial bias of cutting tool; make use of rotation shaft driving mechanism to realize feed of cutting tool along the helical trail; it can realize such functions as drilling, boring, reaming, helical milling and reaming of elliptical recess.

9 Claims, 6 Drawing Sheets

(51) Int. Cl.
  *B64F 5/00* (2017.01)
  *B23P 23/02* (2006.01)
  *B23Q 3/00* (2006.01)
  *B64F 5/10* (2017.01)

(52) U.S. Cl.
  CPC ...... *B23C 2220/28* (2013.01); *B23C 2220/52* (2013.01); *B23C 2265/16* (2013.01); *B23P 2700/01* (2013.01); *B23Q 3/002* (2013.01); *B23Q 2210/006* (2013.01); *B64F 5/10* (2017.01)

(58) Field of Classification Search
  CPC .. B23C 2260/56; B23P 23/02; B23P 2700/01; B23B 43/02; B23B 43/00
  See application file for complete search history.

(56) References Cited

FOREIGN PATENT DOCUMENTS

| | | |
|---|---|---|
| CN | 103192125 | 7/2013 |
| CN | 103894678 | 7/2014 |
| CN | 204148591 | 2/2015 |
| WO | WO2013020664 | 2/2013 |

* cited by examiner

MULTI-FUNCTIONAL END EFFECTOR

This is a U.S. national stage application of PCT Application No. PCT/CN2016/095606 under 35 U.S.C. 371, filed Aug. 17, 2016 in Chinese, claiming priority of Chinese Application No. 201610571566.9, filed Jul. 15, 2016, all of which are hereby incorporated by reference.

FIELD OF THE INVENTION

The present invention is related to the field of auto drilling for digital assembly of airplane, in particular to a multifunctional end effector.

BACKGROUND ARTS

Accompanied by accelerated development of aviation industry, higher requirements have been increasingly put forward for the flight performance of airplane. To reduce deadweight, and improve invisibility performance of the airplane, such materials as aluminum, titanium alloy and carbon fiber reinforced polymer (CFRP) have been applied to the wings of airplane in large quantity. Upper and lower sidings of the wings of modern airplane are in an integral structure, which has extremely higher requirements for assembly. Lower siding is to be connected to internal frame with bolts and nuts in advance in case of assembly of wings of the airplane. As one side of frame is connected with a lower siding, it is impossible to use conventional bolts and nuts to connect upper siding to be further assembled with the frame. In such case, it is necessary to install lug-free plate nut on the frame firstly, and then use bolts and lug-free plate nuts to connect and fix upper siding to realize integral assembly of wing structure.

To realize connection of lower siding between bolts and nuts of the internal frame, it is necessary to make throughhole on the laminated rack formed by siding and frame. The CFRP and titanium alloy belongs to materials that are typically difficult for processing with excessively varied processing performance. With regard to laminated structure formed by the two materials, fabrication of through hole with conventional drilling and milling approaches may result in ablation and lamination to the CFRP and curving to titanium alloy. To improve hole quality, there is no choice but to repeatedly use drilling-reaming-boring technique that has such disadvantages as low efficiency, high impact from artificial factors and instable perforation quality. As a new drilling technique, helical milling is quite different from conventional drilling technique, which is characterized in that the cutting tool with diameter slightly smaller than that of hole is available for high-speed rotation and revolution around the central axis of hole during processing, and the trail of cutting tool center is a helical line. Helical milling can produce hole with varied diameters by using the same cutting tool through change of eccentricity. Its eccentric processing approach is favorable for removal of chips; whereas its intermittent cutting process is favorable for heat dissipation and extension of service of the cutting tool. Furthermore, less axial force during drilling can minimize generation of burs on titanium alloy, and restrict lamination to the CFRP.

To realize connection between upper siding and internal frame, it is necessary to make mounting hole for lug-free plate nuts on the frame. As the connection port of lug-free plate unit is an ellipse, it is necessary to proceed with secondary processing to make an elliptical recess at the inlet port of through hole on the frame to complete processing of mounting hole for lug-free plate nuts once the through hole is made on the laminated structure formed by upper siding and frame.

Presently, elliptical recess is artificially made. In view of its complicated processing techniques, it is necessary to define orientation of processing tool so as to realize precise reciprocating swing of cutting tool along the positioned orientation. This will bring forth high difficulty to processing, which may result in low processing efficiency and high processing cost.

SUMMARY OF THE INVENTION

In view of excellent drilling performance of helical milling and urgent demand for automatic reaming of elliptical recess, a multifunctional end effector according to the present invention can realize helical hole milling and reaming of elliptical recess simultaneously;

precision of through hole and elliptical recess as made by the device can be assured through positioning of processing orientation by sensor and accurate measurement of feed rate of spindle, bias and swing angle of cutting tool by numerous measuring elements. As a critical part of digital, automatic and intelligent drilling system, such multifunctional end effector can realize flexible auto drilling, helical milling and reaming of elliptical recess of high precision and efficiency based on end connection assembly and combination with numerical controlled (NC) lathe.

The multifunctional end effector provided by the present invention is targeted at materials that are difficult for processing, such as the CFRP and titanium alloy used to large parts of airplane, which can overcome ablation and lamination to the CFRP and curving to titanium alloy as brought forth by conventional drilling approaches owing to its integrated functions as helical milling and reaming of elliptical recess.

Specific technical solutions of the present invention are stated as follows:

a multifunctional end effector, comprising a base and a cutting tool;

a feed slide on the base, a feed driving mechanism used to drive the feed slide to put the cutting tool into motion;

a swing slide on said feed slide and a swing driving mechanism used to drive the swing slide to realize circular swing of the cutting tool;

a mounting base on the swing slide; the mounting base is provided with a revolving rotation shaft and rotation shaft driving mechanism used to drive the revolving rotation shaft and make the cutting tool rotate;

an eccentric slide fixed to the end of the revolving rotation shaft; the cutting tool is connected to the end of the eccentric slide via the electric spindle;

an eccentric regulating mechanism used to regulate the eccentric slide to control radial bias of the cutting tool.

According to the present invention, the cutting tool is fixed to the electric spindle on the end of eccentric slide; the feed driving mechanism aims to drive feed slide to realize feed motion of swing slide, mounting base, revolving rotation shaft and eccentric slide so as to make the cutting tool shift to work pieces for drilling, boring or reaming;

Simultaneously with feeding of cutting tool, the swing driving mechanism will drive swing slide, and set mounting base, revolving rotation shaft and eccentric slide into circular arc swing to realize feeding of cutting tool along the swing trail and reaming of elliptical recess;

Furthermore, it is applicable to control radial bias of the cutting tool, and keep it away from the center of revolving rotation shaft by certain distance regulation of distance between eccentric slide and revolving rotation shaft by using eccentric regulating mechanism. After that, simultaneously with feeding of cutting tool, the rotation shaft driving mechanism will drive revolving rotation shaft for rotation to realize feeding of the cutting tool along the trail of helical line and helical milling.

In a preferred embodiment, one side of the base is installed with end connection assembly for fixed connection with the lathe; cable and pipeline modules are integrated inside the end connection assembly to realize quick positioning and connection of CNC ("Computer Numerical Control") machine;

The other side is provided with a presser foot used to press work pieces, a cylinder used to put the presser foot into motion along the presser foot guide and a feed shaft length gage used to measure feed rate of the presser foot. Driven by the cylinder, the presser foot is used to press work pieces, and measure and feedback feed rate of presser foot via the feeding shaft length gage to realize precise control of cutting tool feed and processing depth.

In a preferred embodiment, the presser foot comprises a pressing sleeve; numerous laser range sensors are provided at the periphery of the pressing sleeve to detect normal vector of hole position on work pieces through coordination; the center of presser foot head is provided with a working cavity for penetration of cutting tool; the cavity wall is provided with chip removing hole linked up with the chip removing tube; such chip removing tube is connected to the induced draft fan; suction force produced by chip removing tube at the chip removing hole can remove chips produced during processing of work pieces in time.

In a preferred embodiment, the feed driving mechanism comprises a linear guide pair, a ball screw feed driving assembly connected with the feed slide, a feed motor used to drive the ball screw feed driving assembly for rotation to realize feed motion of feed slide along the linear guide pair and a linear grating used to measure the feed rate. In other words, the feed motor makes use of the ball screw feed driving assembly to set the feed slide into motion along the linear guide so as to realize feed of the cutting tool; through detection of displacement to the feed slide, the linear grating aims to provide feedback of feed rate to realize precision control of recess reaming depth.

In a preferred embodiment, the swing driving mechanism comprises:

a circular arc gear installed on the feed slide, a circular arc guide pair and a swing shaft coder;

an anti-backlash gear installed on a swing slide for engagement with the circular arc gear and a swing shaft motor used to drive the anti-backlash gear for rotation to realize circular arc swing of the swing slide along the circular arc guide pair.

In order to realize reaming of an elliptical recess, it is necessary to start the swing driving mechanism; with the help of engagement between the anti-backlash gear and the circular arc gear, the swing shaft motor aims to realize circular arc swing of the swing slide along circular arc guide pair to ensure feeding of cutting tool along swing trail. Furthermore, combined use of the anti-backlash gear and the swing shaft coder is favorable for precise control of swing angle of the swing slide.

In a preferred embodiment, the rotation shaft driving mechanism comprises a large pulley B for fixed connection with a revolving rotation shaft and a revolving motor installed on the mounting base to drive the large pulley B via the synchronous belt.

The rotation shaft driving mechanism aims to realize revolution of the revolving rotation shaft; revolving rotation shaft is installed inside the mounting base in a movable manner; large pulley B is fixed and covered on the revolving rotation shaft; revolving motor makes use of synchronous belt to coordinate with large pulley B, and drive the revolving rotation shaft.

In a preferred embodiment, the eccentric regulating mechanism comprises a bearing seat inside the revolving rotation shaft, a bevel gear B fixed and connected with a large pulley A inside the bearing seat, an eccentric ball screw transmission pair for transmission coordination between eccentric slide and bevel gear shaft and a cross guide pair used to realize eccentric linear shift of eccentric slide;

Screw inside the eccentric ball screw transmission pair is installed with a bevel gear A for engagement with the bevel gear B;

The large pulley A is driven by the eccentric shaft motor installed on the mounting base.

To realize helical milling function of the present invention, it is necessary to make use of an eccentric regulating mechanism to regulate radial bias of a cutting tool in relation to the center of the revolving rotation shaft at first; with the help of transmission coordination between the synchronous belt and the large pulley A, the eccentric shaft motor drives bevel gear shaft for rotation, and set the eccentric ball screw transmission pair into motion through engagement between bevel gear A and B. This aims to make the eccentric slide shift along the cross guide pair, change the distance between the cutting tool and revolving rotation shaft, and thereby realize regulation of the radial bias of cutting tool.

In a preferred embodiment, a synchronous locking mechanism is provided between the revolving rotation shaft and bevel gear shaft; the synchronous locking mechanism comprises:

a cylinder with a built-in cylinder piston for slide coordination along the bevel gear shaft;

a mounting flange fixed with the bevel gear shaft;

a spring hollow shaft installed on the mounting flange in a movable manner; an extension sleeve of this shaft oriented towards the cylinder piston is provided with a spring;

a taper piston fixed to the extension end of the spring hollow shaft to press against the cylinder piston;

a spring sleeve fixed to the mounting flange; its inner wall is provided with a bevel offsetting the conical surface of taper piston and a pressing surface with circumference fitting with inner wall of the revolving rotation shaft.

According to the present invention, a peripheral conical surface of the taper piston will press against a bevel of an inner wall of the spring at locking status to make the periphery of spring sleeve press against an inner wall of the revolving rotation shaft, and maintain synchronization between the revolving rotation shaft and the bevel gear shaft. Once locking is released, the cylinder piston inside the cylinder will extend to drive the taper piston and spring hollow shaft to separate the bevel of spring and taper piston from that of the inner wall of spring sleeve. Once the pressure imposed on the bevel is released, the pressing surface on the periphery of spring sleeve is to be separated from the revolving rotation shaft to release the locking. Similarly, once the cylinder inside the cylinder body is retracted, the spring as retracted will push the spring hollow shaft and taper piston for resetting. As a result of it, bevel of taper piston will press against that of the inner wall of the spring sleeve to further make spring sleeve press against the inner wall of revolving rotation shaft to realize synchronous locking of revolving rotation shaft and bevel gear shaft;

Wherein, a bevel gear shaft penetrates through the cylinder for coordination with a slide seal of the cylinder piston; the bevel gear shaft is provided with an air induction channel, which is connected to the inner part of the cylinder via the air inlet to make the compressed air led in by the rotary joint come into the cylinder to drive the cylinder piston.

Therefore, it is essential to maintain synchronous revolution of the internal bevel gear shaft simultaneously with rotation of revolving rotation shaft so as to prevent change to bias of cutting tool, and improve processing precision.

In a preferred embodiment, the mounting base is provided with an eccentric shaft length gage used for measurement, feedback and precise control of radial bias to the cutting tool.

In a preferred embodiment, a cable tray is provided between the mounting base and the spindle sleeve outside of the electric spindle. Furthermore, a stop bearing is provided between the spindle sleeve and eccentric slide. A cable tray is provided with cable in it. The cable tray and stop bearing aims to control spindle sleeve for horizontal movement to prevent twisting of cable on the electric spindle during revolution of the electric spindle.

The present invention has the following advantages:

1) It is integrated with such functions as drilling, boring, reaming, helical milling and reaming of the elliptical recess;

2) The end connection assembly aims at modularization of all cables and pipelines to realize quick mechanical positioning and connection with CNC machine;

3) It is applicable to make use of the eccentric ball screw transmission pair for high-precision regulation of bias to the cutting tool; it is also applicable to make use of the eccentric shaft length gage for measurement and feedback of bias to the cutting tool so as to ensure precise regulation of bias to the cutting tool;

4) Feedback of position of such measuring elements as the feed shaft length gage, linear grating and swing shaft coder can ensure precise drilling of through hole and reaming of elliptical recess;

5) Industrial camera can correct position of prefabricated holes on work pieces; whereas four laser range sensors can detect normal vector of hole position to ensure precise and safe drilling;

6) It can be used in combination with CNC machine to realize auto drilling of high precision and efficiency.

Figure 1:
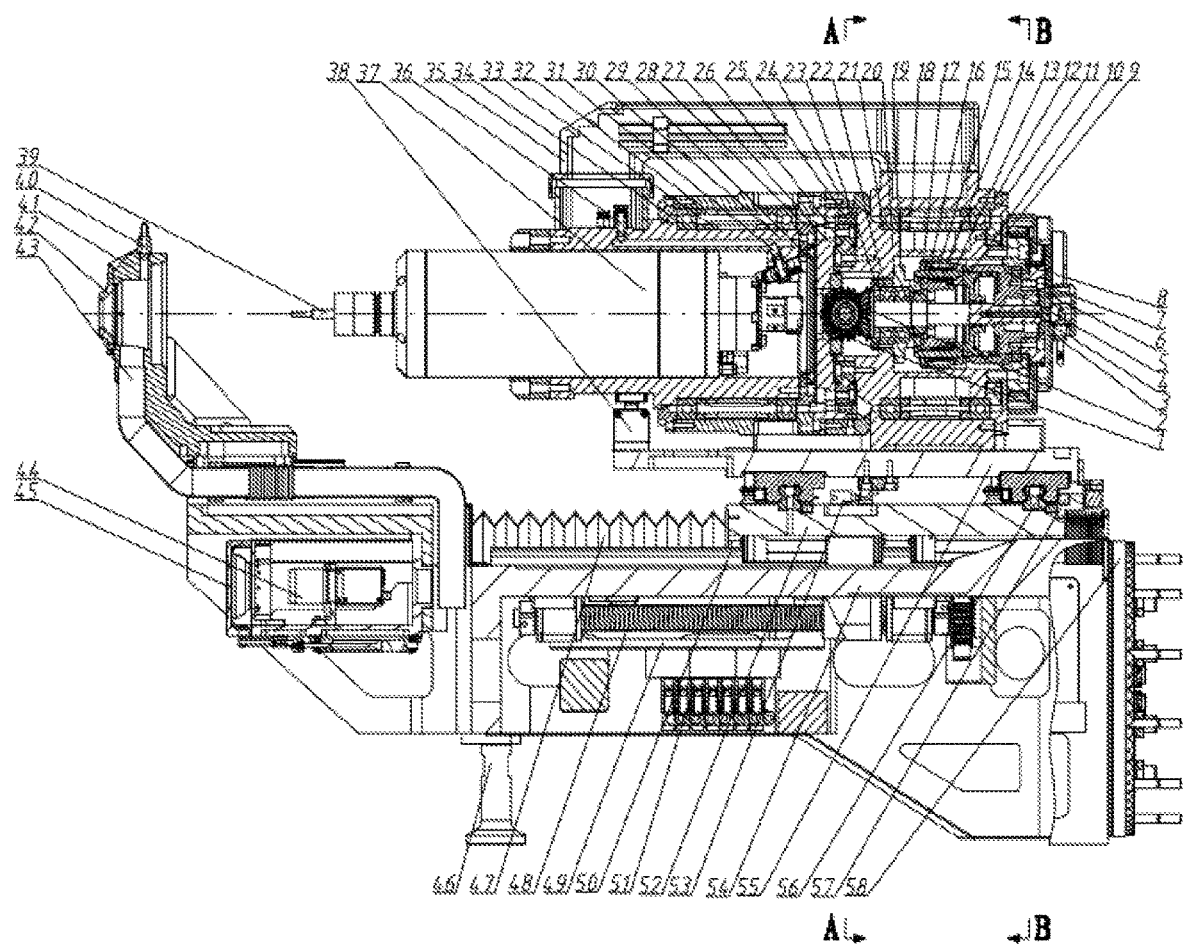
FIG. 1 is the front view of the multifunctional end effector.
Figure 2:
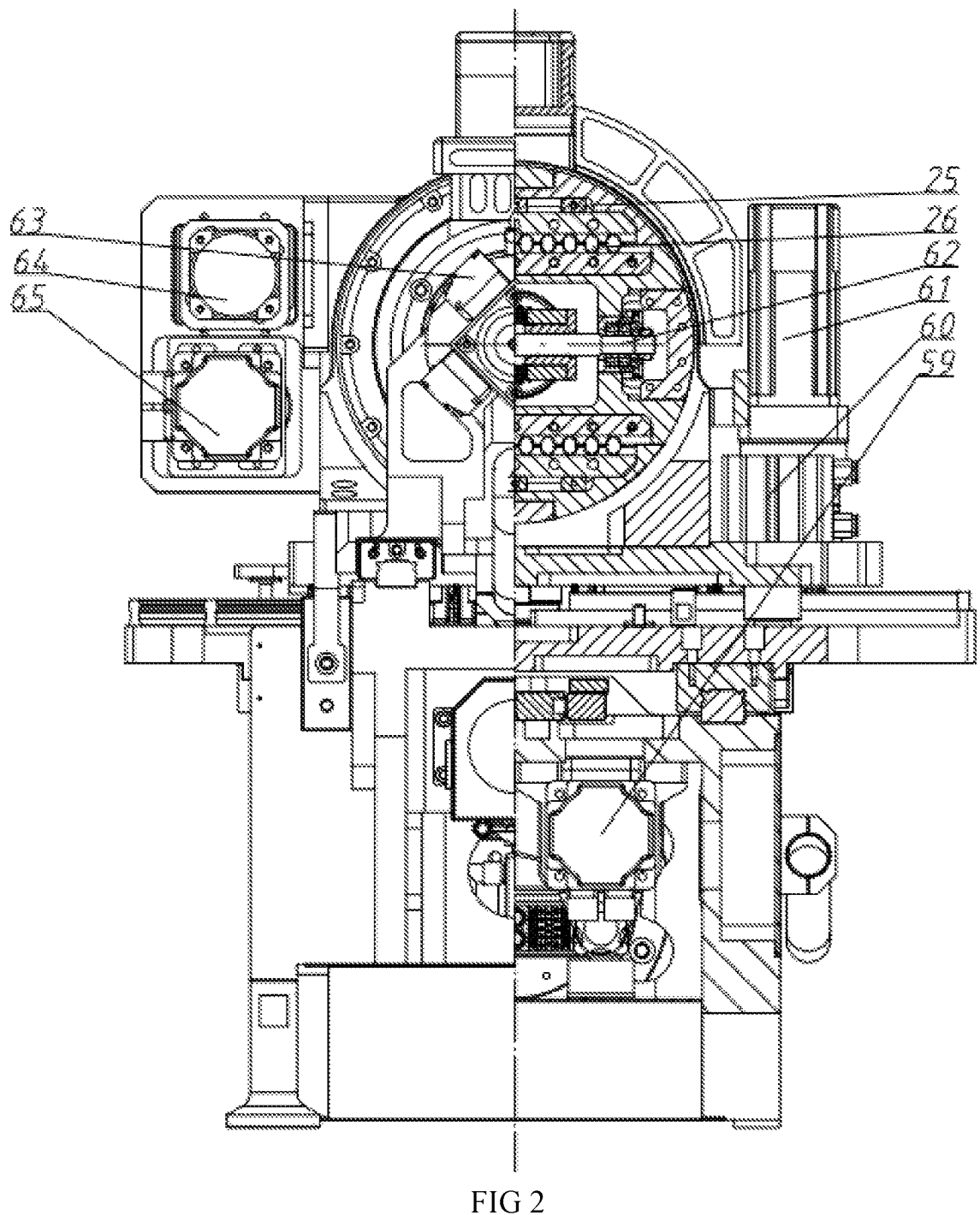
FIG. 2 is the left view of local A-A section as shown in FIG. 1.
Figure 3:
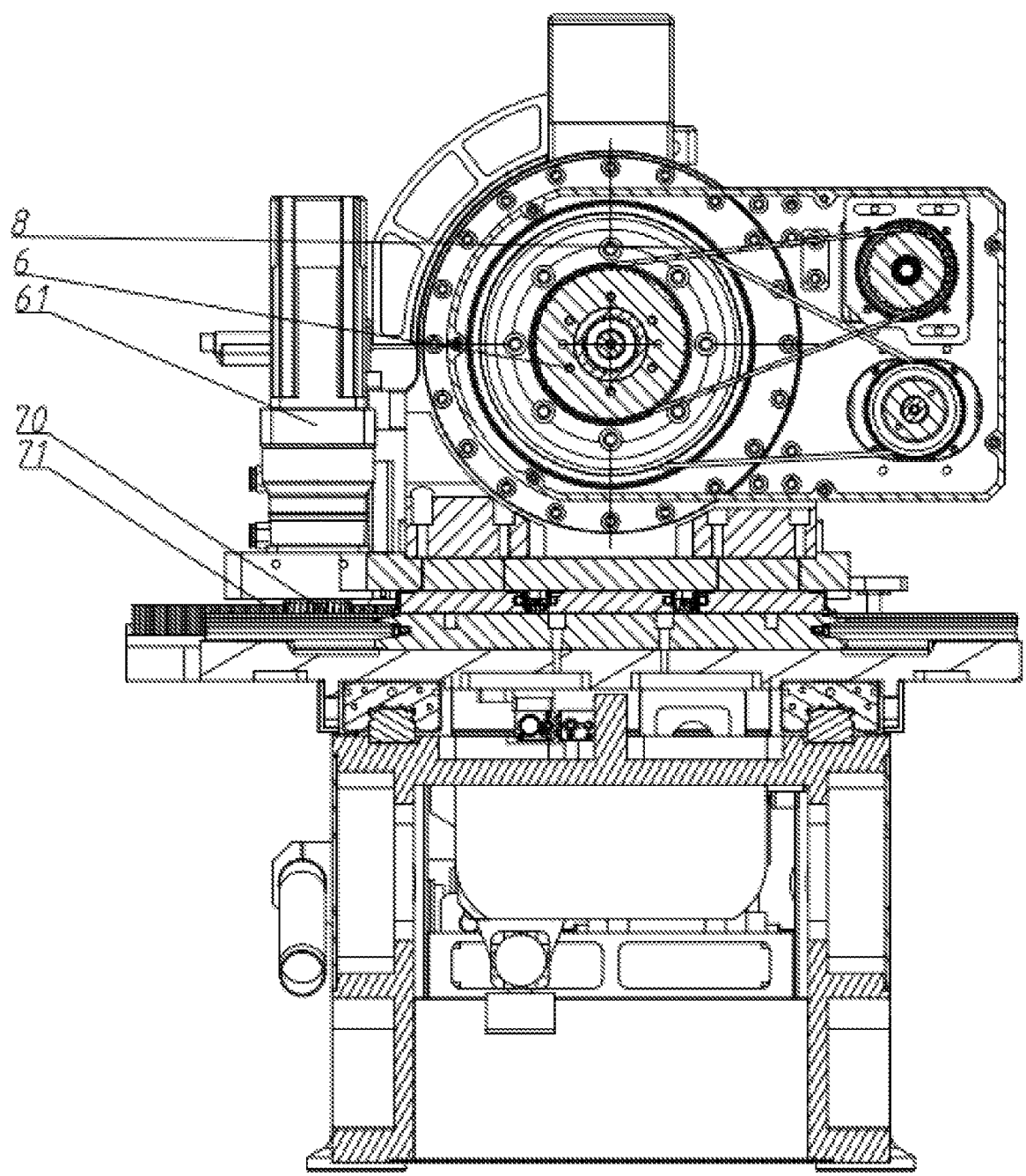
FIG. 3 is the right view of local B-B section as shown in FIG. 1.
Figure 4:
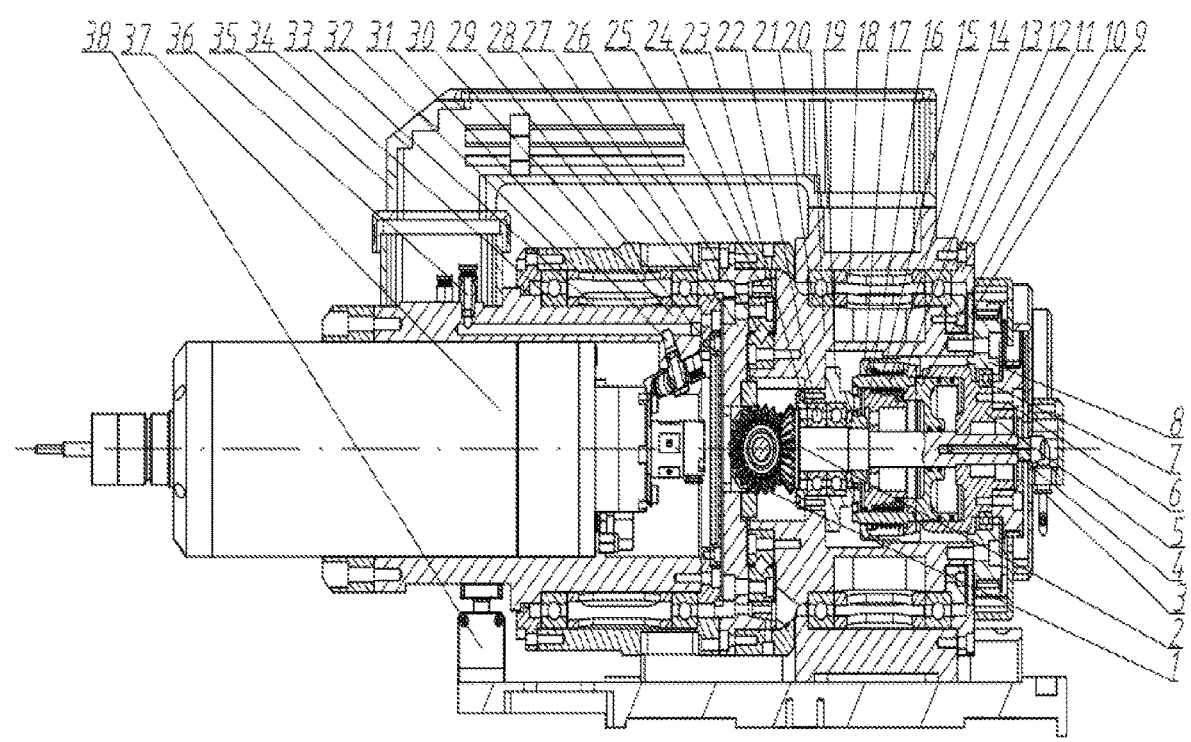
FIG. 4 is the structural diagram for an upper part of the swing slide 55.
Figure 5:
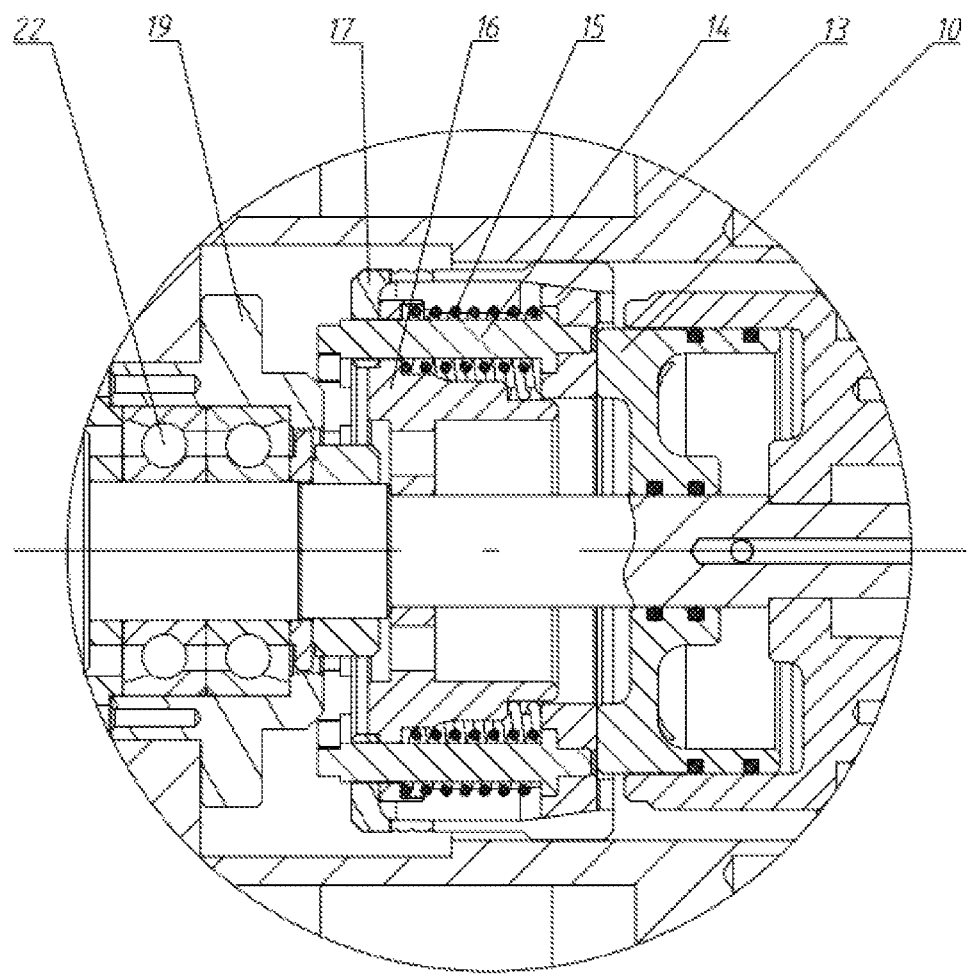
FIG. 5 is the enlarged view of the synchronous locking mechanism.
Figure 6:
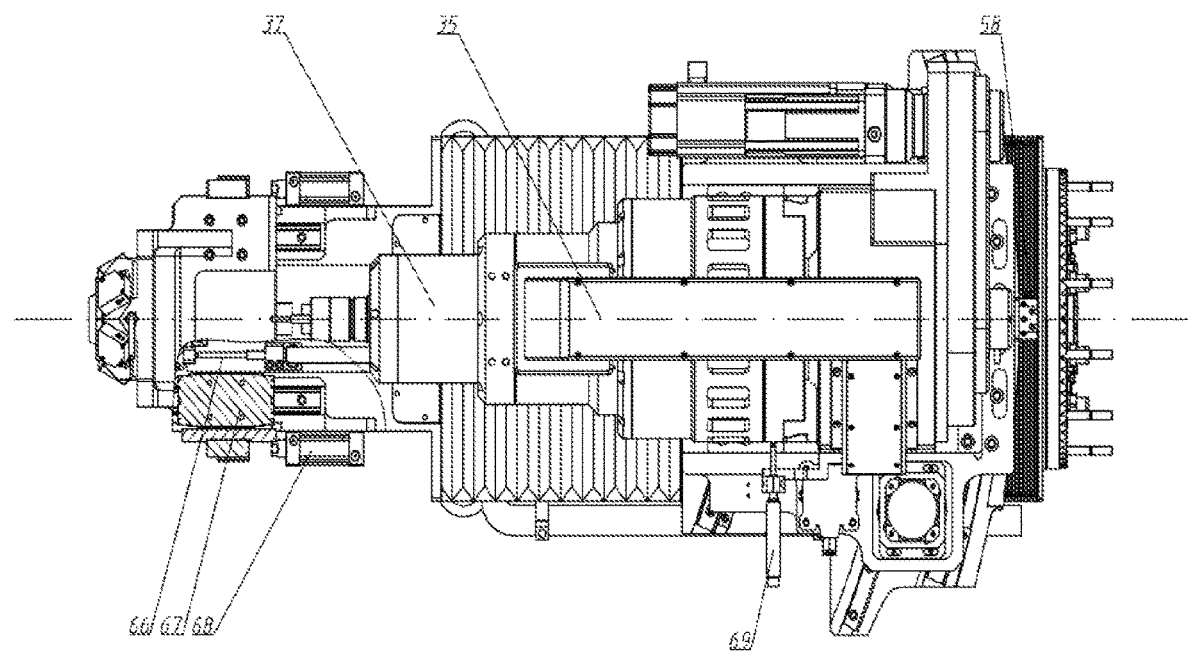
FIG. 6 is the vertical view of the multifunctional end effector (local section view)

In the drawings: a bevel gear A 1, a bevel gear B 2, a revolving joint 3, a bevel gear shaft 4, a cylinder 5, a large pulley A 6, an auxiliary bearing 7, a large pulley B 8, a bearing gland A 9, a cylinder piston 10, a bearing gland B 11, a mounting base 12, a taper piston 13, a spring hollow shaft 14, a spring 15, a mounting flange 16, a spring sleeve 17, a bearing spacer A 18, a bearing seat 19, a revolving rotation shaft 20, a revolving bearing 21, a bevel gear shaft bearing 22, a bearing gland 23, an eccentric shaft auxiliary guide 24, a guide wedge 25, a cross guide pair 26, an eccentric slide 27, a bearing gland 28, a rotary seal plate 29, a spindle sleeve 30, a gas-liquid joint A 31, a bearing seat 32, a bearing spacer B 33, a stop bearing 34, a cable tray 35, a gas-liquid joint B 36, an electric spindle 37, a stop device 38, a cutting tool 39, an oil mist joint 40, a presser foot 41, a pressing sleeve 42, a chip removing tube 43, an industrial camera assembly 44, a camera cover 45, a supporting foot 46, an organ shield 47, ball screw feed driving mechanism 48, linear grating 49, feed linear guide pair 50, a valve terminal 51, a feed slide 52, a photoelectric switch 53, a base 54, a swing slide 55, a circular arc guide pair 56, a swing shaft coder 57, an end connection assembly 58, a feed motor 59, a reset positioning and locking cylinder 60, a swing shaft motor 61, an eccentric ball screw transmission pair 62, a laser range sensor 63, an eccentric shaft motor 64, a revolving motor 65, a feed shaft length gage 66, a presser foot guide 67, a cylinder 68, an eccentric shaft length gage 69, an anti-backlash gear 70 and a circular arc gear 71.

PREFERRED EMBODIMENTS OF THE PRESENT INVENTION

The multifunctional end effector as shown in FIGS. 1-6, comprising a bevel gear A 1, a bevel gear B 2, a revolving joint 3, a bevel gear shaft 4, a cylinder 5, a large pulley A 6, an auxiliary bearing 7, a large pulley B 8, a bearing gland A 9, a cylinder piston 10, a bearing gland B 11, a mounting base 12, a taper piston 13, a spring hollow shaft 14, a spring 15, a mounting flange 16, a spring sleeve 17, a bearing spacer A 18, a bearing seat 19, a revolving rotation shaft 20, a revolving bearing 21, a bevel gear shaft bearing 22, a bearing gland 23, an eccentric shaft auxiliary guide 24, a guide wedge 25, a cross guide pair 26, an eccentric slide 27, a bearing gland 28, a rotary seal plate 29, a spindle sleeve 30, a gas-liquid joint A 31, a bearing seat 32, a bearing spacer B 33, a stop bearing 34, a cable tray 35, a gas-liquid joint B 36, an electric spindle 37, a stop device 38, a cutting tool 39, an oil mist joint 40, a presser foot 41, a pressing sleeve 42, a chip removing tube 43, an industrial camera assembly 44, a camera cover 45, a supporting foot 46, an organ shield 47, ball screw feed driving mechanism 48, linear grating 49, feed linear guide pair 50, a valve terminal 51, a feed slide 52, a photoelectric switch 53, a base 54, a swing slide 55, a circular arc guide pair 56, a swing shaft coder 57, an end connection assembly 58, a feed motor 59, a reset positioning and locking cylinder 60, a swing shaft motor 61, an eccentric ball screw transmission pair 62, a laser range sensor 63, an eccentric shaft motor 64, a revolving motor 65, a feed shaft length gage 66, a presser foot guide 67, a cylinder 68, an eccentric shaft length gage 69, an anti-backlash gear 70 and a circular arc gear 71.

The feed linear guide pair 50, linear grating 49, ball screw feed driving mechanism 48, end connection assembly 58, feed motor 59, presser foot guide 67, cylinder 68 and feed shaft length gage 66 are all operatively installed on the base 54. The feed slide 52 is operatively connected with the ball screw feed driving mechanism 48. The ball screw feed driving mechanism 48 is operatively connected with feed motor 59. The feed motor 59 drives ball screw feed driving mechanism 48 for rotation to realize feeding motion of the feed slide 52 along the linear guide pair 50.

The swing shaft coder 57, circular arc gear 71 and circular arc guide pair 56 are operatively installed on the feed slide 52. The mounting base 12, swing shaft motor 61 are operatively installed on the swing slide 55. The swing slide 55 is operatively connected with circular arc guide pair 56. The swing shaft motor 61 is operatively connected with anti-backlash gear 70.

The anti-backlash gear 70 is operatively engaged with circular arc gear 71. The swing shaft motor 61 makes anti-backlash gear 70 rotate to realize circular arc swing of swing slide 55 along circular arc guide pair 56.

The revolving rotation shaft 20 is provided in the mounting base 12. The mounting base 12 is operatively connected with revolving rotation shaft 20 via the revolving bearing 21. The revolving rotation shaft 20 is fixed to a large pulley B with screws. The revolving motor 65 is installed on the external side of mounting base 12. The revolving motor 65 makes use of the large pulley B 8, revolving rotation shaft 20 and cross guide pair 26 to make eccentric slide 27 rotate.

The bearing seat 19 is provided in revolving rotation shaft 20. The bearing seat 19 is connected with the bevel gear shaft 4 via the bevel gear shaft bearing 22. The bevel gear shaft 4 is fixed to a large pulley A. The eccentric slide 27 is connected with the bevel gear shaft 4 via the eccentric ball screw transmission pair 62. The eccentric slide 27 is connected with the revolving rotation shaft 20 via cross guide pair 26. The eccentric shaft motor 64 is operatively installed on the external side of mounting base 12. The eccentric shaft motor 64 makes use of the large pulley A to drive bevel gear shaft for rotation. The bevel gear shaft 4 makes use of eccentric ball screw transmission pair 62 to make the eccentric slide 27 shift along cross guide pair 26.

The electric spindle 37 is fixed on the eccentric slide 27, and the cutting tool 39 is installed on the electric spindle 37. Driven by the cylinder 68, the presser foot 41 can move along the presser foot guide 67. The presser foot 41 is provided with four laser range sensors 63, the pressing sleeve 42 and the chip removing tube 43.

The device in this embodiment is integrated with such functions as drilling, boring, reaming, helical milling and reaming of elliptical recess. The end connection assembly is integrated with all cable and pipeline modules to realize quick mechanical positioning and connection with CNC machine. The electric spindle 37 is linked with the eccentric shaft motor 64 via the eccentric slide 27, eccentric ball screw transmission pair 62 and bevel gear shaft 4 to realize radial bias of cutting tool.

Figure 7:
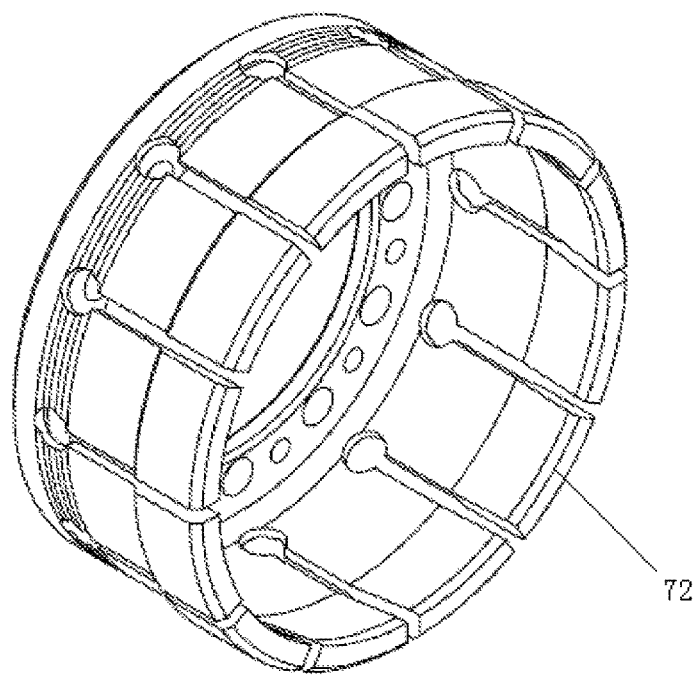
FIG. 7 is the structural diagram for the spring sleeve.

The spring sleeve 17 aims to realize synchronous locking of the revolving rotation shaft 20 and bevel gear shaft 4 under the support of the taper piston 13 as pressed by spring 15 and cylinder piston 10. The corresponding synchronous locking mechanism comprises the cylinder 5, cylinder piston 10, taper piston 13, spring hollow shaft 14, spring 15, mounting flange 16 and spring sleeve 17. The structure of the spring sleeve 17 is as shown in FIG. 7, on which deformable elastic trip 72 is wound and intermittently distributed. The inner wall of the elastic trip 72 is provided with a bevel matched with peripheral bevel of the taper piston 13. When extruded by the taper piston 13, the elastic trip 72 will be deformed slightly outwards to press internal part of revolving rotation shaft 20. In particular, the air as released will pass through the end air tube and rotary joint 3 to come into the bevel gear shaft 4, which will further come into the space as formed by cylinder 5 and cylinder piston 10 through the small hole on bevel gear shaft. The cylinder piston 10 will push the taper piston 13 to make the elastic body formed by the spring hollow shaft 14 and spring 15 retract backward. Owing to coordination between the taper piston 13 and the bevel of spring sleeve 17, the spring sleeve 17 is to be isolated from revolving rotation shaft 20 to make bevel gear shaft 4 disengaged from revolving rotation shaft 20, and release synchronous locking. If the air is switched off, such locking mechanism will automatically rebound under the action of spring 15 to realize synchronous locking of bevel gear shaft 4 and revolving rotation shaft 20.

Under the action of the cylinder piston 10, the air coming into cylinder 5 from rotary joint 3 will push the taper piston 13 to eliminate the support action of the spring sleeve 17 so as to release synchronous locking of revolving rotation shaft 20 and bevel gear shaft 4. The feed shaft length gage 66 and linear grating 49 aim to measure and feedback feed rate of presser foot 41 and feed slide 52 to realize precise control of recess reaming depth. The eccentric shaft length gage 69 aims at measurement, feedback and precise control of radial bias of cutting tool. The anti-backlash gear 70 and swing shaft coder 57 are used in combination to realize precise control of swing angle of swing slide 55. The reset positioning and locking cylinder 60 makes use of the latch connected to feed slide 52 to maintain swing slide 55 at zero position during drilling of through hole on the device. The cable tray 35 and stop bearing 34 aim to control spindle sleeve 30 for horizontal motion to prevent twisting of cable on electric spindle 37 that is in revolution. The industrial camera assembly 44 is installed at the front part of base 54 to detect prefabricated holes position on work pieces. The presser foot 41 is installed with four laser range sensors 63 to check normal vector to the position of drilling hole on work pieces.

The operation process of the present invention is stated as follows:

1. The end connection assembly 58 is used to install the device according to present invention on the CNC machine;

2. The CNC machine was used to shift the device according to the present invention to the position of benchmark hole on the work piece. The industrial camera assembly 44 is used to measure deviation to the position of benchmark hole. The coordinate of actual hole position was defined based on position deviation and theoretical coordinate of the hole as measured. The device of the present invention, is further shifted to the actual hole position;

3. Four laser range sensors 63 on presser foot 41 are used to measure surface normal of prefabricated hole on the work piece. The CNC machine is used to adjust posture of the device according to the present invention to make sure that main axis is in superposition with surface normal of work piece.

4. The cylinder 68 pushes presser foot 41 out to make pressing sleeve 42 press against the work piece;

5. The induced draft fan is turned on to make chip removing tube 43 produce suction force. Step 6 is executed for drilling, boring and reaming, and Step 8 and 11 were switched over respectively in case of helical milling and reaming of elliptical recess;

6. The electric spindle 37 is started. The feed motor 59 is used to set ball screw feed driving assembly 48 into rotation to realize feeding motion of feed slide 52 along linear guide pair 50; maintain linear feed of cutting tool until the hole is drilled;

7. The feed slide 52 and presser foot 41 are retracted, and then switched over to Step 12;

8. The air coming into rotary joint 3 is used to release synchronous locking of revolving rotation shaft 20 and bevel gear shaft 4. The eccentric shaft motor 64 is set into rotation based on aperture of fabricated hole D and cutting tool diameter d. The eccentric regulating mechanism was used to adjust cutting tool bias distance $$e = \frac{D-d}{2}.$$

The air circulating inside rotary joint 3 is turned off upon completion of adjustment to realize synchronous locking of revolving rotation shaft 20 and bevel gear shaft 4;

9. The revolving motor 65 is used, and the large pulley B is used to make revolving rotation shaft 20 rotate. The electric spindle 37 will rotate around axis of revolving rotation shaft at radius e. The electric spindle 37 is started. The motor 59 is driven to make ball screw feed driving assembly 48 rotate to realize feeding motion of feed slide 52 along linear guide pair 50 and feed of cutting tool along the helical trail until the drilling is completed;

10. The feed slide 52 and presser foot 41 are retracted. The revolving motor 65 is turned off. The air coming into rotary joint 3 is used to release synchronous locking of revolving rotation shaft 20 and bevel gear shaft 4. The eccentric regulating mechanism is used to adjust bias of cutting tool e to 0; switch over to Step 12;

11. The electric spindle 37 is started. The feed motor 59 is used to make ball screw feed driving assembly 48 rotate to realize feed motion of feed slide 52 along linear guide pair 50. The swing shaft motor 61 is started, and the anti-backlash gear 70 and circular arc gear 71 are used to realize reciprocating swing of swing slide 55 along the circular arc guide pair 56. The coordinated movement of feed slide 52 and swing slide 55 are used to realize feed of cutting tool 39 along the swing trail until reaming of elliptical recess is completed;

12. The electric spindle 37 is turn off. The induced draft fan is turned off. The CNC machine is used to shift the end effector to next position for drilling or stop it.

What mentioned above are preferred embodiments of the present invention, which do not intend to restrict the present invention; any alteration, equivalent substitution and improvement as made based on spirit and principles of the present invention are within the protection scope of the present invention.

The invention claimed is:

1. A multifunctional end effector, characterized in that the multifunctional end effector comprises:
    a base (54) and a cutting tool (39);
    a feed slide (52) on the base (54), a feed driving mechanism used to drive the feed slide (52) to put the cutting tool (39) in motion;
    a swing slide (55) on the feed slide (52) and a swing driving mechanism used to drive the swing slide (55) to realize circular swing of the cutting tool (39);
    a mounting base (12) on the swing slide (55); the mounting base (12) is provided with a revolving rotation shaft (20) and a rotation shaft driving mechanism used to drive the revolving rotation shaft (20) and make the cutting tool (39) rotate;
    an eccentric slide (27) fixed to an end of the revolving rotation shaft (20); the cutting tool (39) is connected to an end of the eccentric slide (27) via an electric spindle (37);
    an eccentric regulating mechanism used to regulate the eccentric slide (27) to control radial bias of the cutting tool (39);
    wherein the eccentric regulating mechanism comprises a bearing seat (19) provided inside of the revolving rotation shaft (20), a bevel gear B (2) provided inside the bearing seat (19) for fixed connection with the large pulley A (6), an eccentric ball screw transmission pair (62) for transmission coordination between the eccentric slide (27) and the bevel gear shaft (4) and a cross guide pair (26) used to set the eccentric slide (27) into eccentric and linear motion;
    a ball screw inside the eccentric ball screw transmission pair (62) is installed with a bevel gear A (1) for engagement with the bevel gear B (2);
    the large pulley A (6) is driven by the eccentric shaft motor (64) installed on the mounting base (12).

2. The multifunctional end effector according to claim 1, characterized in that an end connection assembly (58) used for fixed connection with a lathe is installed on one side of the base (54); the other side of the base is provided with a presser foot (41), a cylinder (68) is used to put the presser foot (41) into motion along a presser foot rail (67) and a feed shaft length gage (66) is used to measure feed rate of the presser foot (41).

3. The multifunctional end effector according to claim 2, characterized in that the presser foot (41) comprises a pressing sleeve (42); numerous laser range sensors (63) are installed on a periphery of the pressing sleeve (42); a central part of the pressing sleeve (42) is a working cavity for penetration of the cutting tool (39); the cavity wall is linked up with a chip removing tube (43).

4. The multifunctional end effector according to claim 1, characterized in that the feed driving mechanism, comprises a linear guide pair (50), a ball screw feed driving assembly (48) connected with the feed slide (52), a feed motor (59) used to make the ball screw feed driving assembly (48) rotation to realize feed motion of the feed slide (52) along the linear guide pair (50) and a linear grating (49) used to measure feed rate.

5. The multifunctional end effector according to claim 1, characterized in that the swing driving mechanism comprises:
    a circular arc gear (71) installed on the feed slide (52), a circular arc guide pair (56) and a swing shaft coder (57);
    an anti-backlash gear (70) installed on the swing slide (55) for engagement with the circular arc gear (71) and a swing shaft motor (61) used to set the swing slide (55) into circular arc swing along the circular arc guide pair (56) through driving the anti-backlash gear (70) for rotation.

6. The multifunctional end effector according to claim 1, characterized in that the rotation shaft driving mechanism comprises a large pulley B (8) for fixed connection with the revolving rotation shaft (20), a revolving motor (65) installed on the mounting base (12) for driving the large pulley B (8) via a synchronous belt.

7. The multifunctional end effector according to claim 1, characterized in that a synchronous locking mechanism is provided between the revolving rotation shaft (20) and the bevel gear shaft (4); the synchronous locking mechanism comprises:
    a cylinder piston (10) provided inside the cylinder (5) for transmission coordination along the bevel gear shaft (4);
    a mounting flange (16) fixed with the bevel gear shaft (4);
    a spring hollow shaft (14) installed on the mounting flange (16) in a movable manner, and a spring (15) on the extension end sleeve oriented towards the cylinder piston (10);
    a taper piston (13) fixed to the extension end of the spring hollow shaft (14) and pressed against the cylinder piston (10);

a spring sleeve (17) fixed to the mounting flange (16); its inner wall is provided with a bevel offsetting the conical surface of taper piston (13) and a pressing surface with circumference fitting with the revolving rotation shaft (20).

8. The multifunctional end effector according to claim 7, characterized in that the mounting base (12) is provided with an eccentric shaft length gage (69) used to measure radial bias of the feedback cutting tool (39).

9. The multifunctional end effector according to claim 1, characterized in that a cable tray (35) is provided between a spindle sleeve (30) outside of the mounting base (12) and the electric spindle (37), and a stop bearing (34) is provided between the spindle sleeve (30) and the eccentric slide (27).

* * * * *